United States Patent [19]
Morisawa

[11] Patent Number: 5,237,357
[45] Date of Patent: Aug. 17, 1993

[54] APERTURE AND FOCUS ADJUSTING DEVICE FOR A CAMERA

[75] Inventor: Tahei Morisawa, Tokyo, Japan

[73] Assignee: Asahi Kogaku Kogyo Kabushiki Kaisha, Tokyo, Japan

[21] Appl. No.: 846,476

[22] Filed: Mar. 6, 1992

Related U.S. Application Data

[60] Division of Ser. No. 582,763, Sep. 14, 1990, which is a continuation of Ser. No. 359,380, May 31, 1989, Pat. No. 4,975,725.

[30] Foreign Application Priority Data

May 31, 1988 [JP] Japan ................. 63-134196

[51] Int. Cl.⁵ ............................................. G03B 9/08
[52] U.S. Cl. .................. 354/230; 354/234.1; 354/271.1
[58] Field of Search .............. 354/400, 435, 439, 446, 354/451, 452, 453, 270, 271.1, 230, 274, 234.1

[56] References Cited

U.S. PATENT DOCUMENTS

| | | | |
|---|---|---|---|
| 4,005,448 | 1/1977 | Iwata et al. | 354/439 |
| 4,695,144 | 9/1987 | Yoshino et al. | 354/400 |
| 4,696,559 | 9/1987 | Kondo | 354/195.1 |
| 4,779,114 | 10/1988 | Kobayashi | 354/400 |
| 4,868,596 | 9/1989 | Ishida et al. | 354/439 |
| 4,975,725 | 12/1990 | Morisawa | 354/271.1 |
| 5,060,000 | 10/1991 | Ogihara et al. | 354/439 |

FOREIGN PATENT DOCUMENTS 60-235126 11/1985 Japan .

*Primary Examiner*—David M. Gray
*Attorney, Agent, or Firm*—Sandler Greenblum & Bernstein

[57] ABSTRACT

An aperture and focus adjusting device for a camera, is provided with only one reversible motor, a first adjusting mechanism, and a second adjusting mechanism. The first adjusting mechanism is rotated by a first member which is connected to the motor, and the second adjusting mechanism is rotated by a second member to which an intermediate rotational member is connected. The intermediate rotational member is in constant mesh and is rotated with the second member, and is engaged with the first member only within a sector of a rotational range of the first member, to rotate together with the first member. One of the first and second mechanisms is a focus adjusting mechanism, and the other is an aperture adjusting mechanism.

9 Claims, 11 Drawing Sheets

APERTURE AND FOCUS ADJUSTING DEVICE FOR A CAMERA

This application is a division of U.S. Ser. No. 07/582,763, filed Sep. 14, 1990, which is a continuation of application Ser. No. 07/359,380, filed May 31, 1989, now U.S. Pat. No. 4,975,725, issued Dec. 4, 1990.

BACKGROUND OF THE INVENTION

1. Field of the Invention

The present invention relates to an aperture and focus adjusting device used for an electronic still camera or a conventional camera having a focal-plane shutter.

2. Description of the Related Art

The continuing advances in the provision of automatic multifunctions for cameras has inevitably led to an increase in the number of parts, accordingly, the size and weight of cameras has increased and their reliability has been lowered. There is a need for a reduction in the number of parts required in order to reduce the size and weight of cameras. There is also a need to improve reliability, while maintaining the desired automatic multifunctions of cameras.

In the aperture and focus adjusting device of a conventional electronic still camera and the like, the necessary movements for aperture adjustments and focus adjustments are effected by separate motors, which is an example of increased parts.

SUMMARY OF THE INVENTION

Accordingly, a object of the present invention is to provide an aperture and focus adjusting device for a camera by which aperture adjustments and focus adjustments are effected by one motor.

Therefore, in accordance with the present invention, there is provided an aperture and focus adjusting device for a camera, which device comprises a reversible motor, a first adjusting mechanism which is adjusted in accordance with a rotation angle obtained by a rotation of a first member connected to a rotation shaft of the motor, a second adjusting mechanism which is adjusted in accordance with a rotation angle obtained by a rotation of a second member, and an intermediate rotational member connected to the second member to be rotated together with the second member, and engaging with the first member within a sector of a rotation range of the first member, to be rotated together with the first member, wherein one of the first and second mechanisms is a focus adjusting mechanism, and the other is an aperture adjusting mechanism.

The adjusting device is controlled by a control means, which rotates the motor in one direction by a predetermined angle A, to adjust the first adjusting mechanism, and then rotates the motor in a second direction by a predetermined angle B (B<A) to adjust the second adjusting mechanism. After a photograph has been taken, the motor is again rotated in the other direction by an angle (A−B) to initiate both adjusting mechanisms.

In more detail, the first and second members are provided, for example, with engaging teeth formed on a radial projecting portion of a rotation plate, and the intermediate rotational member is, for example, a gear which is in constant mesh with the engaging teeth of the second member, and engages with the engaging teeth of the first member within a sector of the rotational range of the first member.

The motor is, for example, a step motor having a cylindrical rotor, and the rotation axis of the motor is aligned with the optical axis of the photographing lens. The first and second members are, for example, formed with photographing openings at center portions thereof, and the rotation centers thereof are aligned with the optical axis of the photographing lens; the first member being directly connected to the rotor of the motor.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
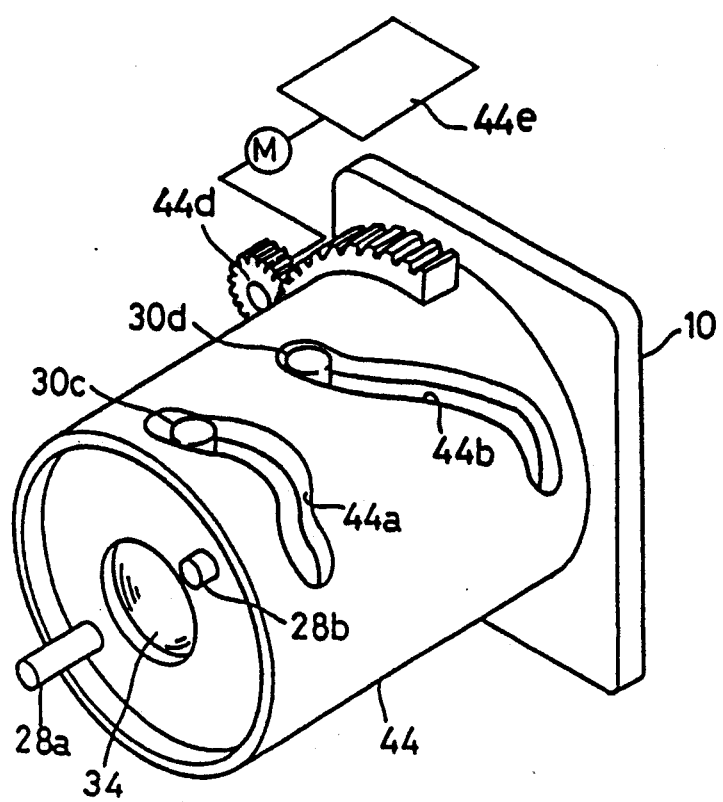
FIG. 1 is a perspective view of a zoom lens containing an aperture and focus adjusting device.

The present invention will be described below with reference to the embodiment shown in the drawings.

Figure 4:
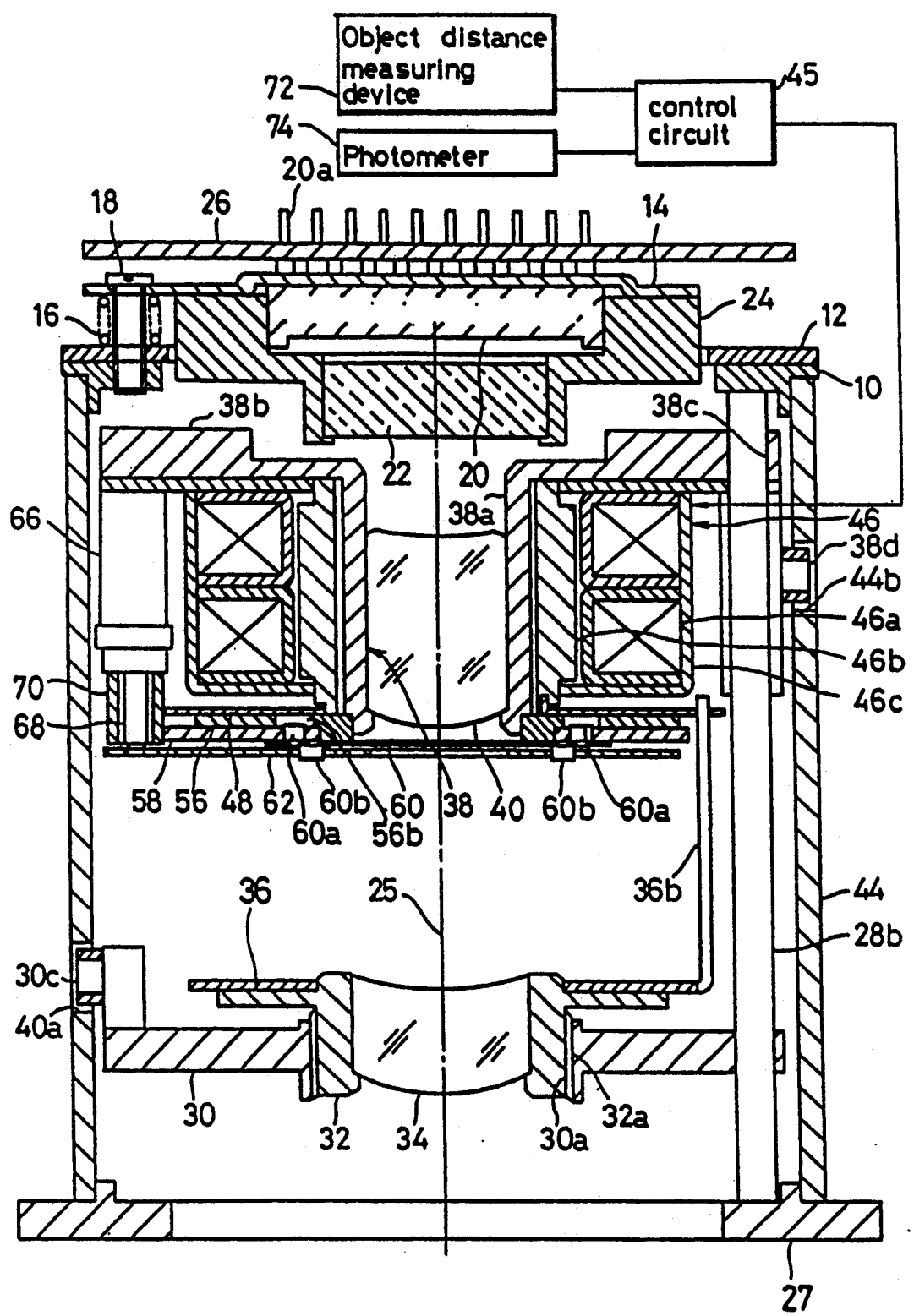
FIG. 4 is an enlarged sectional view of FIG. 1.

As shown in FIG. 4, in a base portion of a zoom lens, a fitting plate 12 is fixed on a back face of a stationary support plate 10, and an imaging device support plate 14 is attached to a rear portion of the fitting plate 12 by three adjusting screws 18 (only one screw 18 is shown in the drawing) via compression springs 16. A stationary frame 24, having a solid state imaging device 20 and a filter 22 fitted therein, is fixed to a front surface of the imaging device support plate 14. The three adjusting screws 18 are provided on a circle about the optical axis 25 at, for example, regular angular intervals, whereby an inclination of an imaging surface of the solid state imaging device 20 to an optical axis 25 can be adjusted by rotating the adjusting screws 18.

Figure 2:
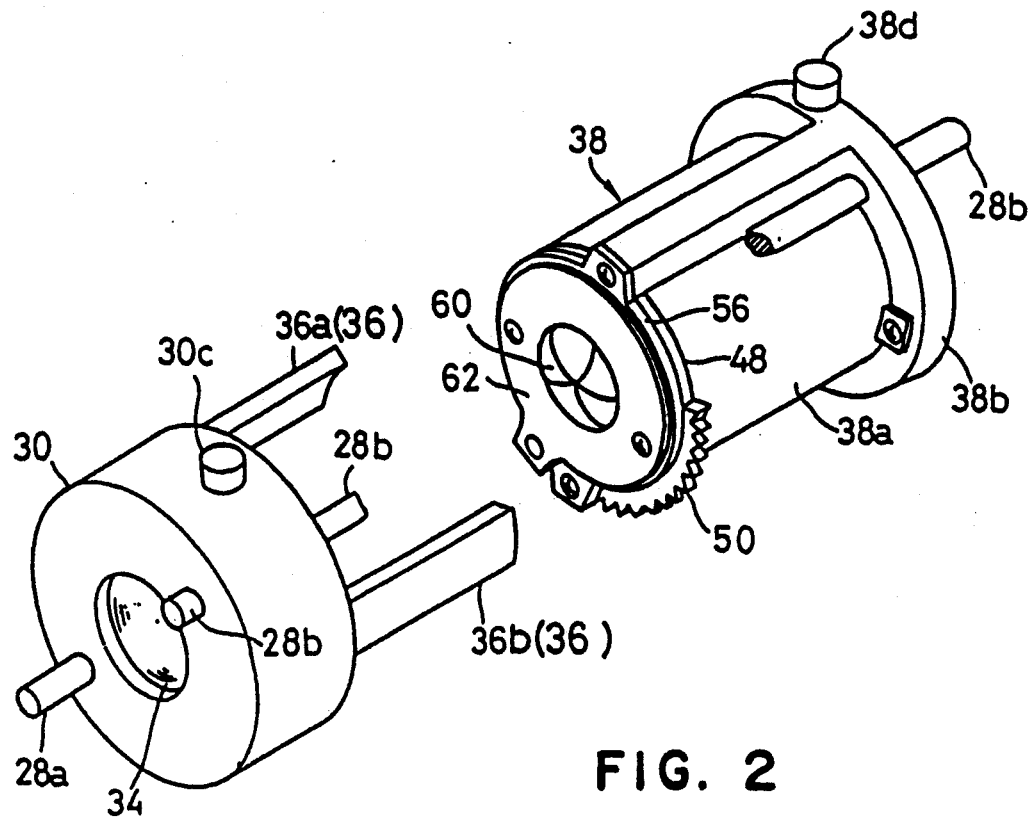
FIG. 2 is a perspective view of the zoom lens of FIG. 1 in a state in which the front lens group system is separated from the zoom lens.

Further, a plurality of terminal pins 20a of the solid state imaging device 20 are soldered to a printed circuit board 26, and a pair of guide rods 28a and 28b are provided between the stationary support plate 10 and a front frame 27, and are in parallel with the optical axis 25, as shown in FIGS. 1, 2 and 4.

As shown in FIG. 4, a female thread 30a is formed on an internal surface of a window provided at a central portion of a front frame 30, the guide rods 28a and 28b penetrate through holes formed in a peripheral portion of the front frame 30, and a male thread 32a formed on an outer surface of a lens frame 32 is threadingly joined to the female thread 30a. A front lens group (focus adjusting lens) 34 is fitted to the lens frame 32, and an engaging arm 36 including arms 36a and 36b extending rearward and in parallel with the optical axis 25, is fixed to a rear portion of the lens frame 32.

A rear frame 38 is provided at a rear portion of the front frame 30, coaxially with the front frame 30, and is composed of a lens frame portion 38a and a disk portion 38b formed on a rear end of the lens frame portion 38a. The guide rods 28a and 28b are extended through holes formed in an outer peripheral portion of the disk portion 38b, and a rear lens group 40 is fitted in the lens frame portion 38a.

Pins 30c and 38d (see FIG. 1) project from an outer surface of the front frame 30 and the rear frame 38, respectively, and are fitted in cam grooves 44a and 44b, respectively, provided in a zoom barrel 44 having both ends rotatably supported by the stationary plate 10 and the front frame 27, respectively. A sector gear 44c is fixed on a outer surface of the zoom barrel 44 as shown in FIG. 1, and engages with a pinion gear 44d driven by a motor M and a control circuit 44e. Accordingly, when the zoom barrel 44 is rotated about the optical axis 25 by the gear mechanism, the pins 30c and 38d are guided by the cam grooves 44a and 44b so that the front frame 30 and the rear frame 38, i.e., the front lens group 30 and the rear lens group 40, are moved along the optical axis 25 to change a focal length within a range of from 35 mm to 70 mm, for example.

A step motor (ring motor) 46 driven by a drive pulse supplied by a control circuit 45 is coaxially attached to an outer surface of the rear lens frame 38a. The step motor 46 comprises a ring coil 46a, which is a stator fixed to the disk plate 38b, and a cylindrical rotor 46b disposed inside the coil 46a. A front end of the rotor 46b is projected from a housing 46c enclosing the coil 46a.

Figure 3:
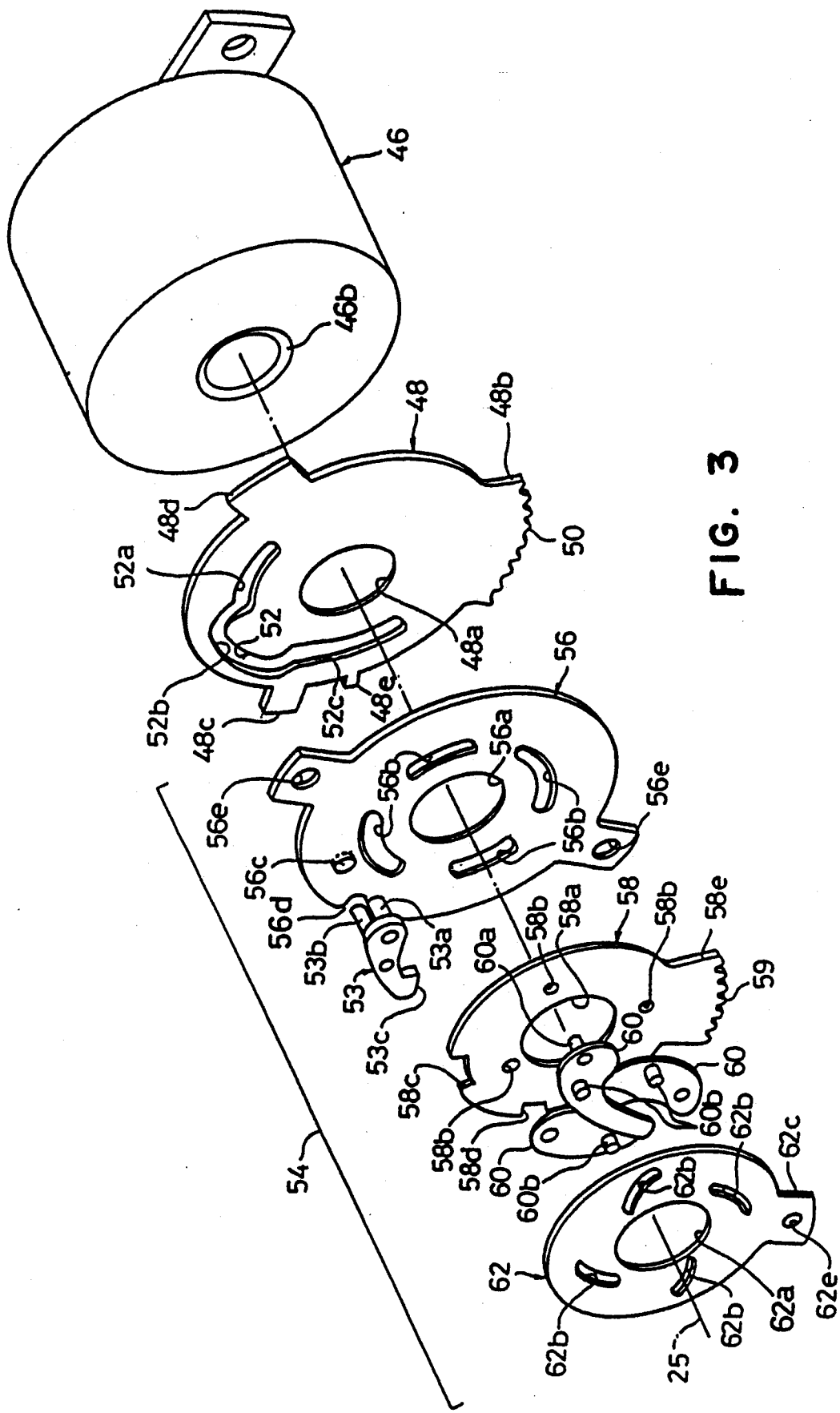
FIG. 3 is an exploded perspective view of a main part of FIG. 2, with the front lens group system omitted.

A focus adjusting plate 48 is provided on the front end of the rotor 46b and rotates together with the rotor 46b. The focus adjusting plate 48 is approximately disk-shaped, as shown in FIG. 3, and at a central portion thereof, is provided with a photographing opening 48a as an optical passage. Further, the outer periphery of the plate 48 is provided with radial projections forming push portions 48b, 48c, 48d and 48e. Engaging teeth 50 are formed on an outer peripheral portion of the push portion 48b; an end of the push portion 48e is bent to form an angle of 90 degrees to the step motor 46, and the push portions 48d and 48e are engaged and disengaged with the arms 36a and 36b of the engaging arm 36.

The focus adjusting plate 48 is further provided with a cam groove 52 which guides a pin 53b projected at an intermediate portion of an engaging lever 53. This cam groove 52 comprises three arcuate cam grooves 52a, 52b and 52c connected to each other. The arcuate cam grooves 52a and 52c have the same radius about the center of the focus adjusting plate 48, to form lock portions, and the arcuate cam groove 52b has a larger radius than the grooves 52a, 52c to form a release portion.

An aperture adjusting mechanism 54 is provided in front of the focus adjusting plate 48, and comprises a support plate 56, an aperture adjusting plate 58, four aperture blades 60, an aperture cam plate 62, and the engaging lever 53.

The support plate 56 is approximately circular, and is provided with a photographing opening 56a as an optical passage, at a center portion thereof. Four release slits 56b in which pins 60a of the aperture blades 60 are fitted are formed around the opening 56a, at regular angular intervals, and a pin hole 56c is provided periphally outward therefrom, in which a pivot pin 53a projected on an end of the engaging lever 53 is fitted. A notch 56d for releasing the pin 53b is provided on an outer periphery of the support plate 56, and stop holes 56e for fixing the plate 56 to the rear frame 38 are provided on an outer peripheral projecting portion of the support plate 56. This support plate 56 is a stationary member, and the pivot pin 53a of the engaging lever 53 is rotatably supported in the pin hole 56c.

The aperture adjusting plate 58 is substantially a circular plate, and is provided with a photographing opening 58a as an optical passage, at a center portion thereof. Four pin holes 58b, in which the pins 60a projected on one surface of the aperture blades 60 are fitted, are formed at regular angular intervals around the photographing opening 58a. An outer periphery of the plate 58 is provided with notches 58c and 58d with which a claw 53c of the engaging lever 53 is engaged, and a projecting portion 58e having engaging teeth 59 formed in an outer peripheral portion thereof.

The aperture cam plate 62 is approximately circular, and is provided with a photographing opening 62a as an optical passage, at a center portion thereof. Four guide slits 62b in which pins 60b projected on the other surface of the aperture blades 60 are fitted are arranged at regular angular intervals around the opening 62a, and are provided with a smooth surface by which the photographing opening 62a is gradually and proportionally separated from one end of the surface to the other end of the surface. A stop hole 62e for fixing the plate 62 to the rear frame 38 is formed in an outer peripheral projecting portion 62c of the aperture cam plate 62.

The support plate 56, the aperture adjusting plate 58, the aperture blades 60, and the aperture cam plate 62 are coaxially aligned one upon the other, and the aperture adjusting plate 58 is separated from the support plate 56 by a spacer (not shown) to form a predetermined gap therebetween. Screws (not shown) are fitted in the stop hole 62e of the aperture cam plate 62 and the stop holes 56e of the support plate 56, and threadingly fitted to a housing of the step motor 46, to fix the aperture adjusting mechanism 54 to the step motor 46. A rotation of the aperture adjusting plate 58 relative to the support plate 56 causes a rotation of the pins 60a of the aperture blades 60, and accordingly, since the pins 60b of the aperture blades 60 are located in the guide slits 62b of the aperture cam plate 62, which is stationary, the aperture is adjusted by the corresponding movement of the four aperture blades 60.

As shown in FIG. 4, an edge portion of the disk portion 38b of the rear frame 38 is provided with a support pole 66 having one end provided with a pin 68, to which an idle gear 70 is rotatably fitted. This idle gear 70 is in constant mesh with the engaging teeth 59 of the aperture adjusting plate 58, and is engaged with the engaging teeth 50 of the focus adjusting plate 48 only in a sector of the entire rotational range of the focus adjusting plate 48.

In FIG. 4, 72 is an object distance measuring device, and 74 is a photometer, which supplies an object distance value and a photometry value of an object to the control circuit 45, respectively. In FIGS. 6 through 12, 76 is a fixed contact, and 78 is a movable contact formed by a plate spring. These contacts 76 and 78 are fixed to the disk portion 38b, respectively. In an initial condition, described later, the movable contact 78 is pushed by a bent end portion of the push portion 48e of the focus adjusting plate 48 and separated from the fixed contact 76.

An operation of the embodiment constructed as described above is described below with reference to FIGS. 5 through 12.

FIG. 5(A) shows a rotation angle of the focus adjusting plate 48, FIG. 5(B) shows an engaging and disengaging condition between the engaging teeth 50 and the idle gear 70. FIG. 5(C) shows a rotation angle of the aperture adjusting plate 58, and FIG. 5(D) shows a rotation angle of the engaging arm 36.

FIGS. 6 through 12 show, in turn, rotational states of the aperture adjusting plate 58 and the engaging arm 36 in accordance with a rotation of the focus adjusting plate 48 in one photographing operation.

Figure 6:
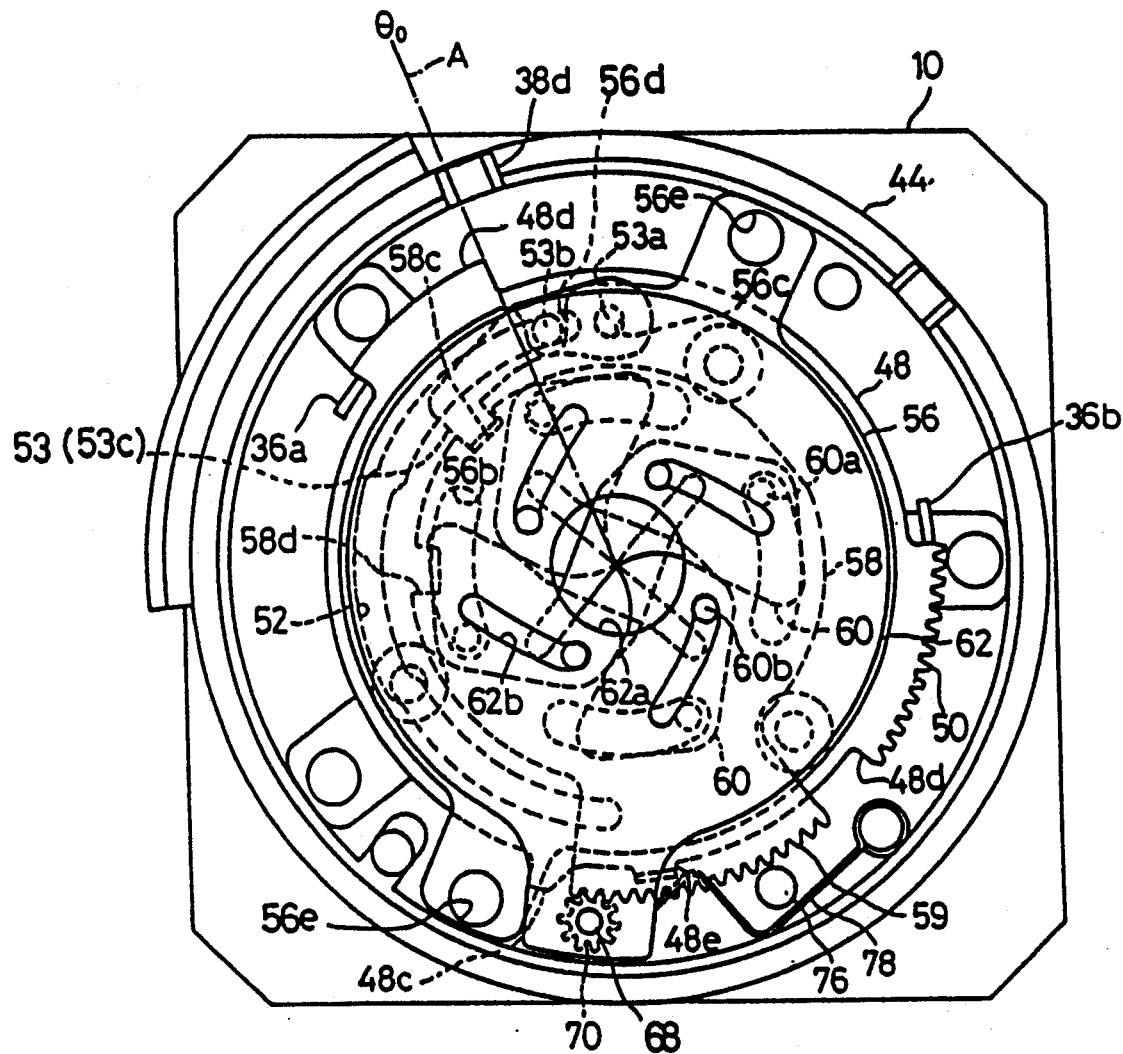
FIGS. 6 through 12 are front views for explaining the operation of the aperture and focus adjusting device.

FIG. 6 shows the initial condition, in which the engaging teeth 50 of the focus adjusting plate 48 is separated from the idle gear 70 by a predetermined constant angle, and the arms 36a and 36b of the engaging arm 36 are in contact with one ends of the push portions 48b and 48d, so that an object distance is set to infinity, and an aperture is set to a closing condition, for example. The claw 53c of the engaging lever 53 is engaged with the notch 58c of the aperture adjusting plate 58, so that the aperture adjusting plate 58 is locked.

In this initial condition, a rotational angle of the chained line A, which connects the center of the focus adjusting plate 48 and one end of the push portion 48d, is assumed to be $\theta_0$. In the following description, a clockwise rotation in FIGS. 6 through 12 is called the frontward direction, and a counter clockwise rotation is called the rearward direction. In the initial condition, the push portion 48e of the focus adjusting plate 48 pushes against the movable contact 78 to separate it from the fixed contact 76.

Prior to the aperture and focus adjustment, a distance measurement and photometry for the object are carried out by the object distance measuring device 72 and the photometer 74.

Then, a number of frontward drive pulses corresponding to the measured distance value are supplied to the step motor 46 from the control circuit 45, whereby the focus adjusting plate 48 is rotated from the initial angle $\theta_0$ as shown in FIG. 6 to $(\theta_1 - \theta_0)$, for example, 57 degrees in the frontward direction. Except at the initial condition, the push portion 48e is separated from the movable contact 78, and thus the movable contact 78 is kept in contact with the fixed contact 76 by the elasticity of the movable contact 78.

Figure 7:
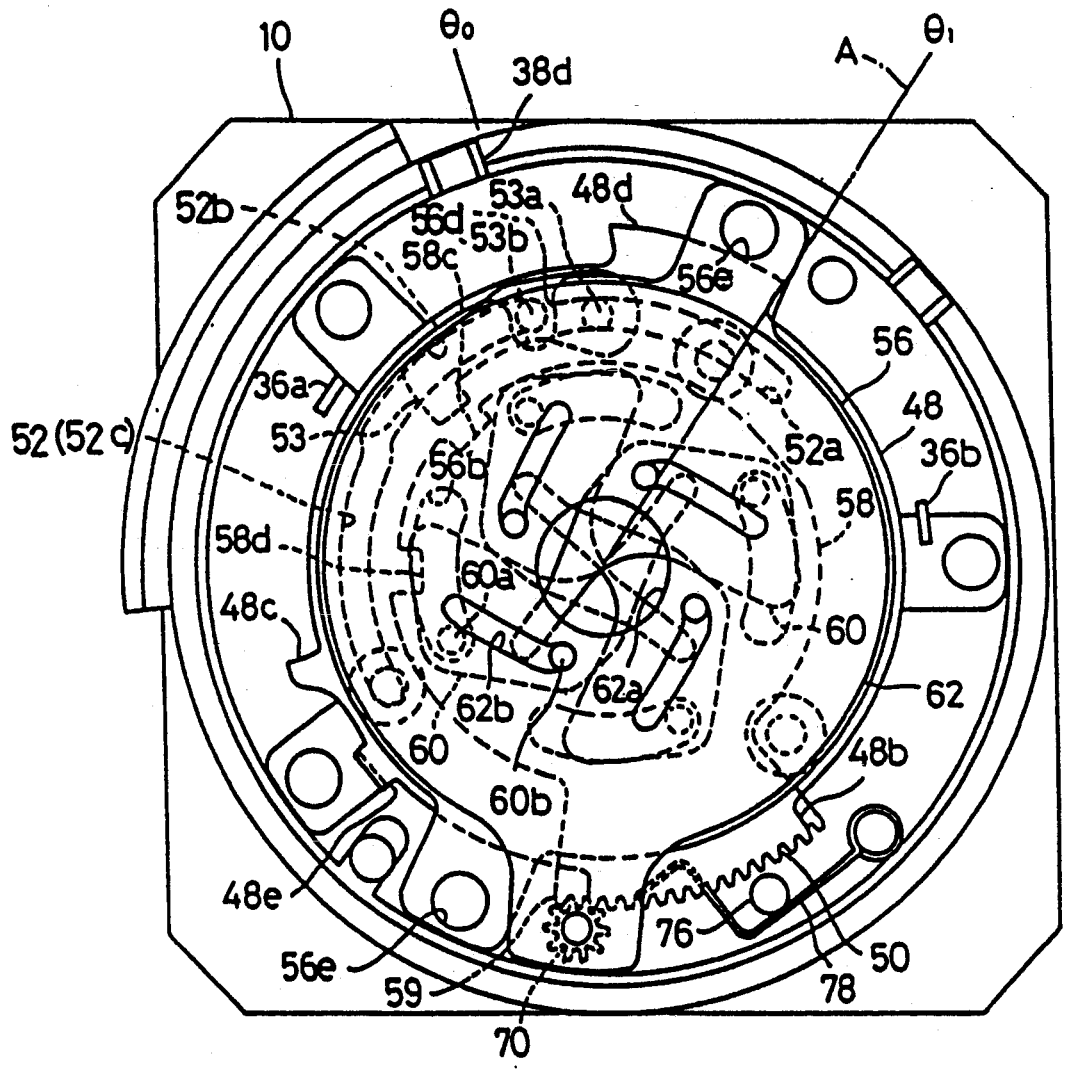
Figure 8:
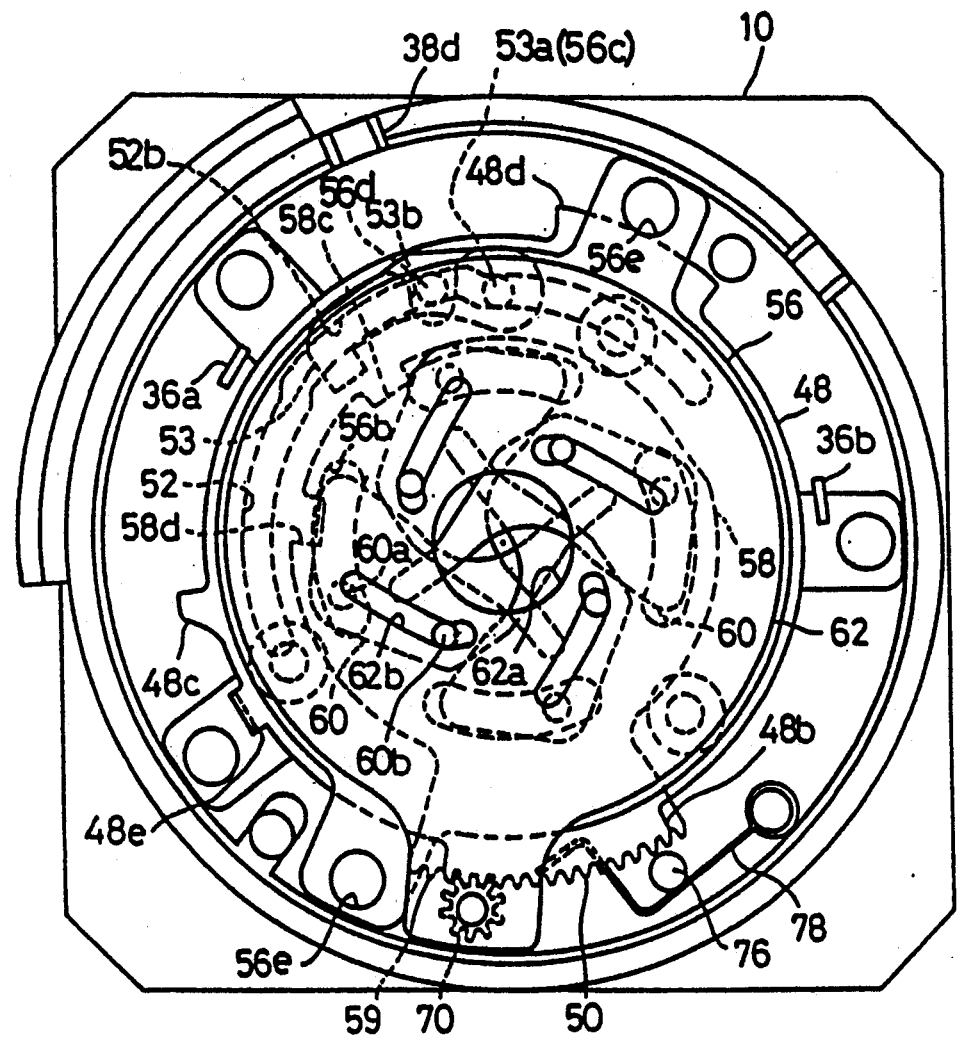

Immediately before the angular position becomes the angle $\theta_1$, for example, at the angle $(\theta_0 + 56$ degrees), the engaging teeth 50 begin to engage with the idle gear 70 as shown in FIG. 7. Immediately before this engagement, the pin 53b of the engaging lever 53 is moved from the groove (the lock portion) 52a of the focus adjusting plate 48 to the groove (the release portion) 52b, and thus the engaging lever 53 is rotated about the pin 53a in the clockwise direction in the drawing. As a result, as shown in FIG. 8, as soon as the engaging teeth 50 are engaged with the idle gear 70, the claw 53c is disengaged from the notch 58c of the aperture adjusting plate 58, and thus the aperture adjusting plate 58 becomes rotatable. Therefore, the aperture adjusting plate 58 is rotated in accordance with a rotation of the idle gear 70, which is rotated by a rotation of the focus adjusting plate 48.

Figure 9:
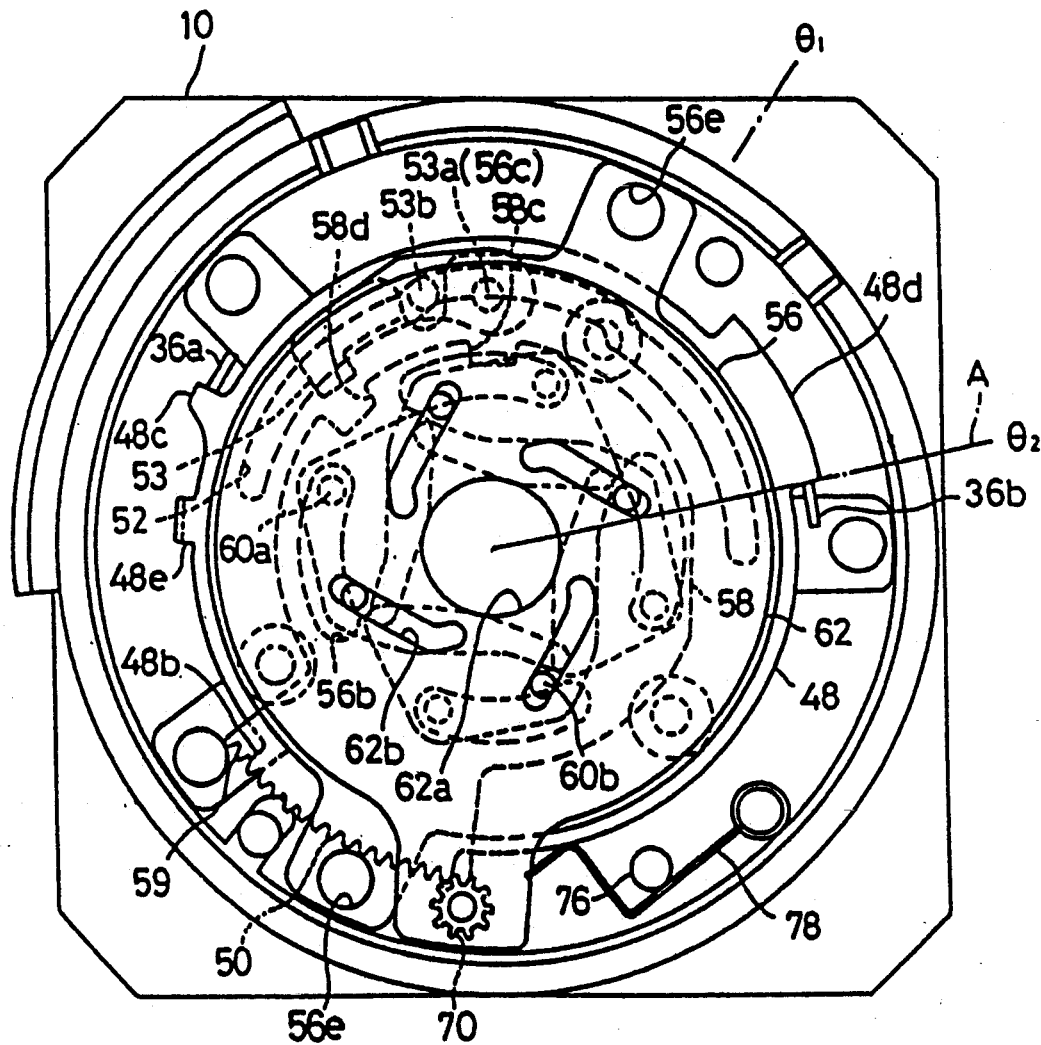

When the focus adjusting plate 48 and the aperture adjusting plate 58 are rotated in the frontward direction from the angle $\theta_1$ by, for example, 45 degrees, to be displaced to an angle $\theta_2$, as shown in FIG. 9, the engaging teeth 50 (and 59) and the idle gear 70 are disengaged. At this time, the aperture is open.

Figure 10:
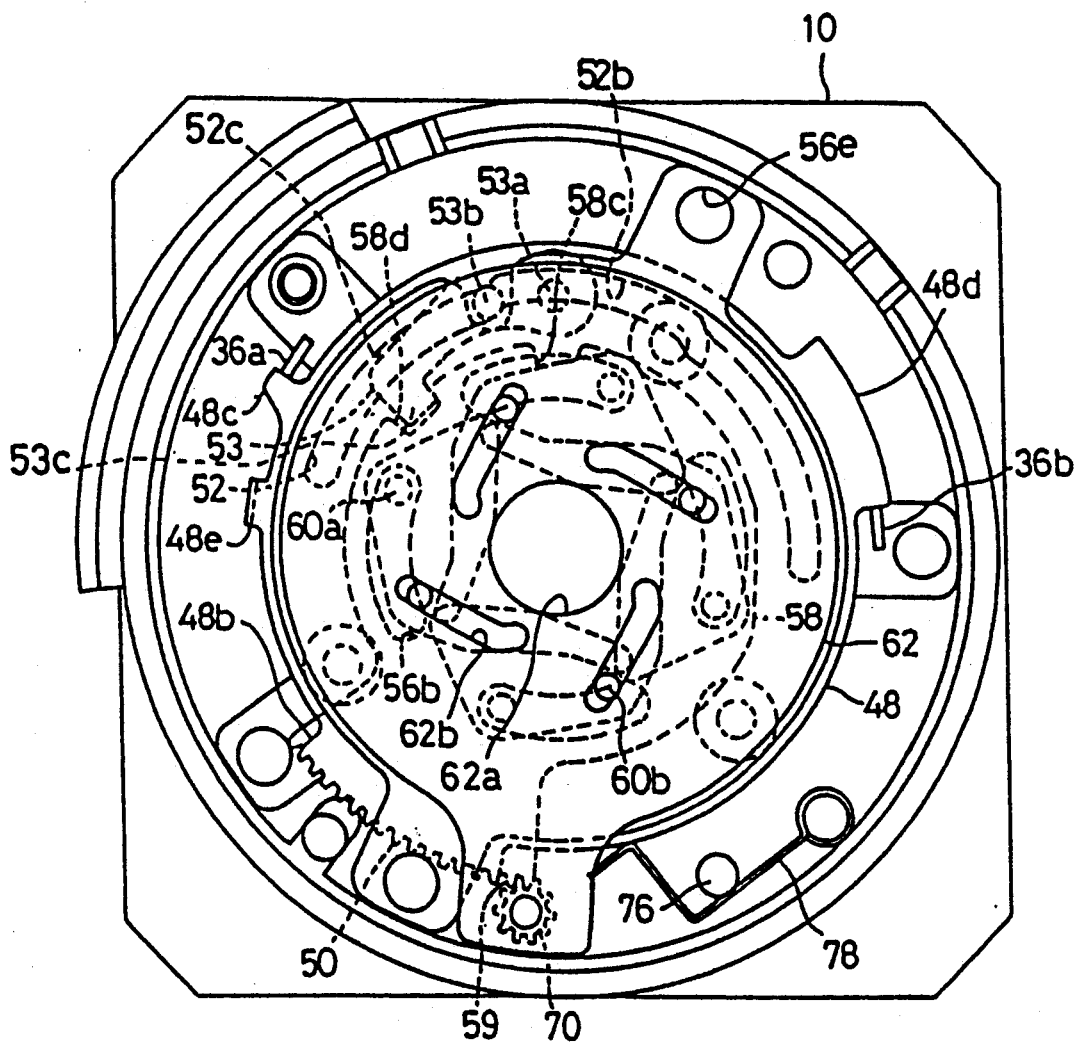

When the focus adjusting plate 48 is further slightly rotated in the frontward direction, as shown in FIG. 10, the pin 53b of the engaging lever 53 is guided from the groove (the release portion) 52b of the focus adjusting plate 48 to the groove (the lock portion) 52c, and as a result, the engaging lever 53 is rotated in a counter clockwise direction so that the claw 53c is again engaged with the notch 58d of the aperture adjusting plate 58, and thus the aperture adjusting plate 58 is locked. Namely, the locked condition of the aperture adjusting plate 48 is released only within the rotational range $(\theta_2 - \theta_1)$ of the focus adjusting plate 48, to cause the aperture to go from the closed condition to the fully open condition. Therefore, when the engaging teeth 50 are not engaged with the idle gear 70, the aperture will not be affected by shock or vibration, whereby it is ensured that an aperture adjustment is precisely carried out every time a photograph is to be taken.

Figure 11:
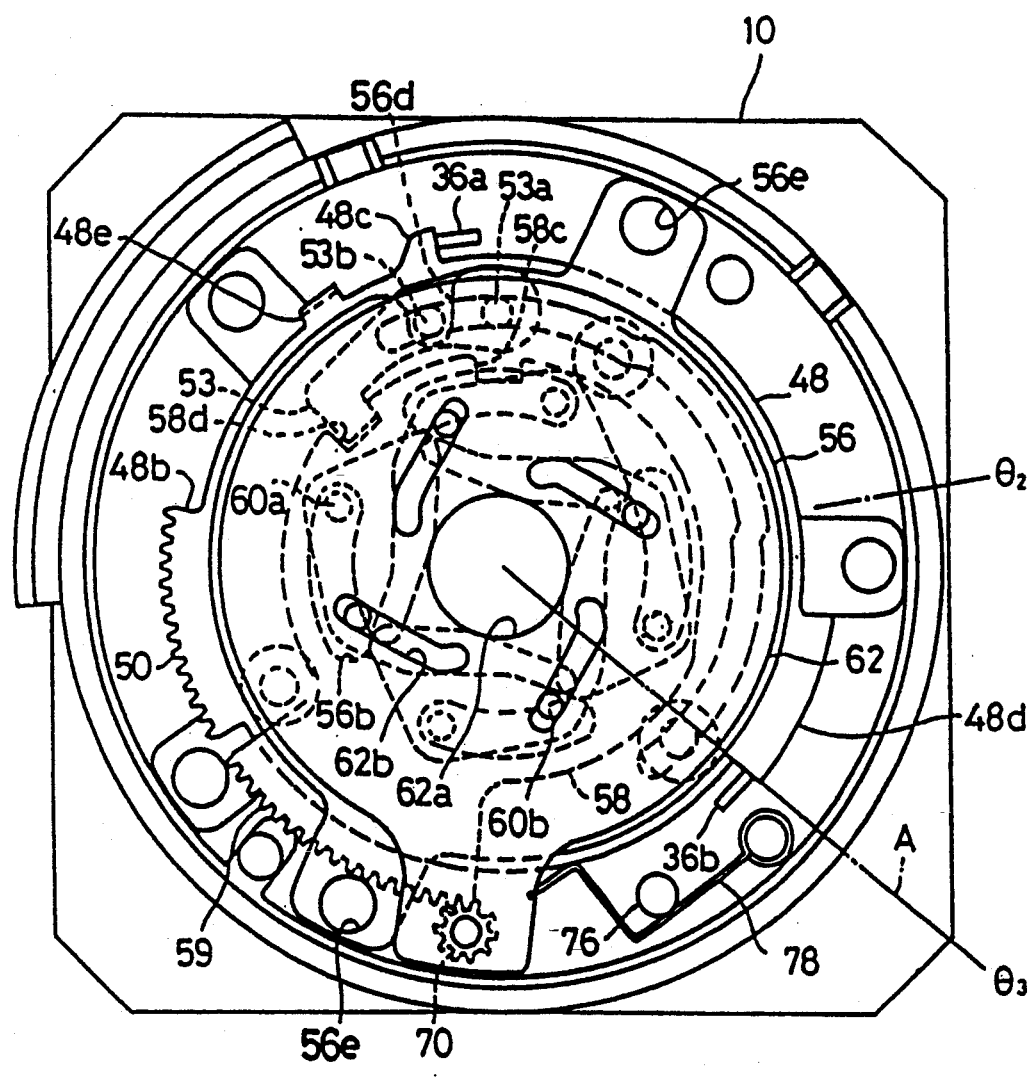

Although the arm 36a and 36b are not rotated within a rotational range $(\theta_0 - \theta_2)$ of the focus adjusting plate 48 end portions facing the frontward direction of the push portions 48c and 48d come into contact with the arms 36a and 36b, respectively, at the angle $\theta_2$. Therefore, if the focus adjusting plate 48 is rotated further in the frontward direction, the arms 36a and 36b are pushed and rotated by the push portions 48c and 48d, whereby the lens frame 32 (the front lens 34) is rotated in this direction in accordance with the threads 30a and 32a and advanced along the optical axis 25. Then, as shown in FIG. 11, at the rotation angle $\theta_3$, the object distance is changed from infinity at the initial condition to the distance measured value, for example, 0.5 m.

Accordingly, the lens frame 32 is rotated by a rotation angle corresponding to the number of frontward direction drive pulses, and thus the focus adjustment operation is completed.

Then, a number of rearward direction drive pulses corresponding to a photometry value are supplied from the control circuit 45 to the step motor 46, whereby the step motor 46 is rotated in the rearward direction by an angle corresponding to the number of pulses, and thus the focus adjusting plate 48 is rotated in the rearward direction. At this time, the engaging arm 36 is not subjected to a force, and therefore, not rotated, and remains at the position at which the focus is correctly adjusted.

Figure 12:
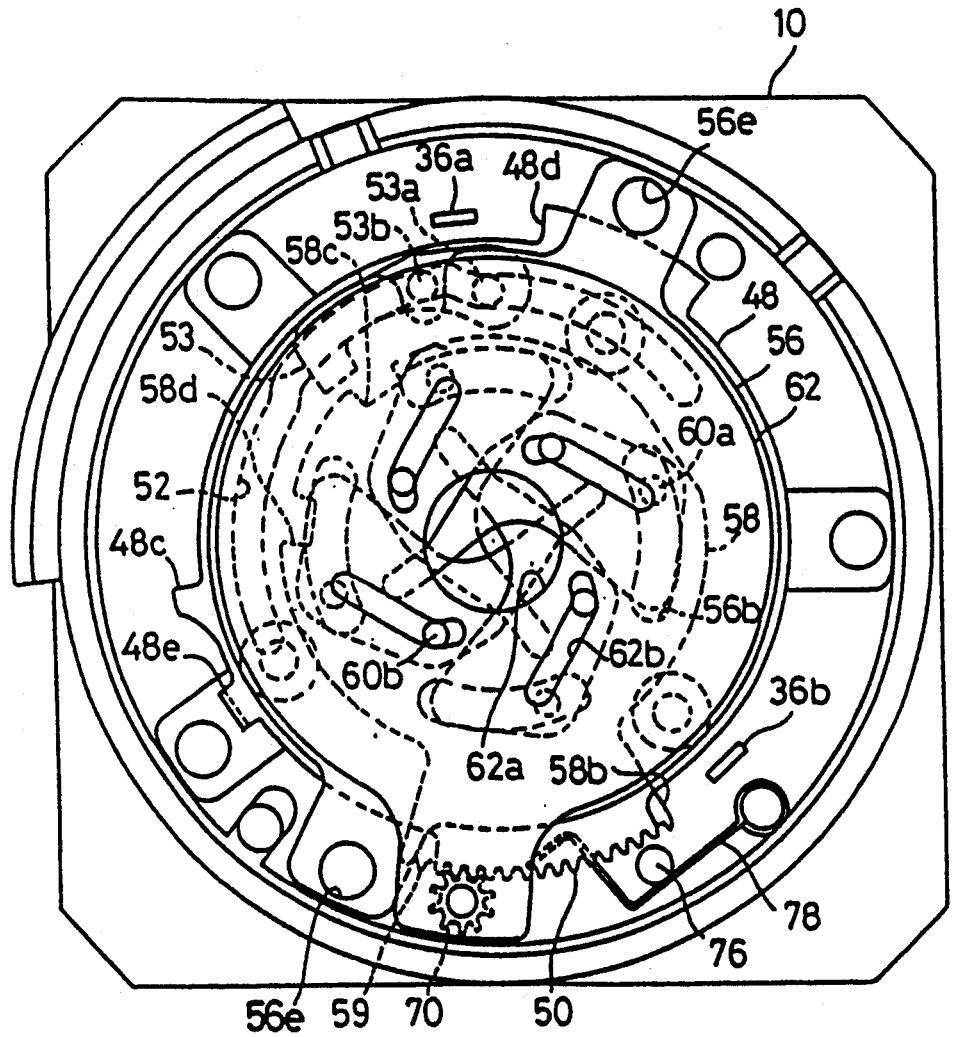

While the focus adjusting plate 48 is rotated in the rearward direction, the engaging teeth 50 are again engaged with the idle gear 70 at the rotational angle $\theta_2$, and thus the idle gear 70 starts to rotate. Accordingly, the idle gear 70 and the aperture adjusting plate 58 engaged with the engaging teeth 59 are rotated in the rearward direction in one body. Then, as shown in FIG. 12, when the rotation of the focus adjusting plate 48 is stopped at an angle corresponding to the photometry value and within a rotation angle range $\theta_2 \sim \theta_1$, the rotation of the aperture adjusting plate 58 is stopped at the same time, and accordingly, the aperture value is fixed, for example, to F8, corresponding to the photometry, and thus the aperture adjustment operation is completed.

Figure 5:
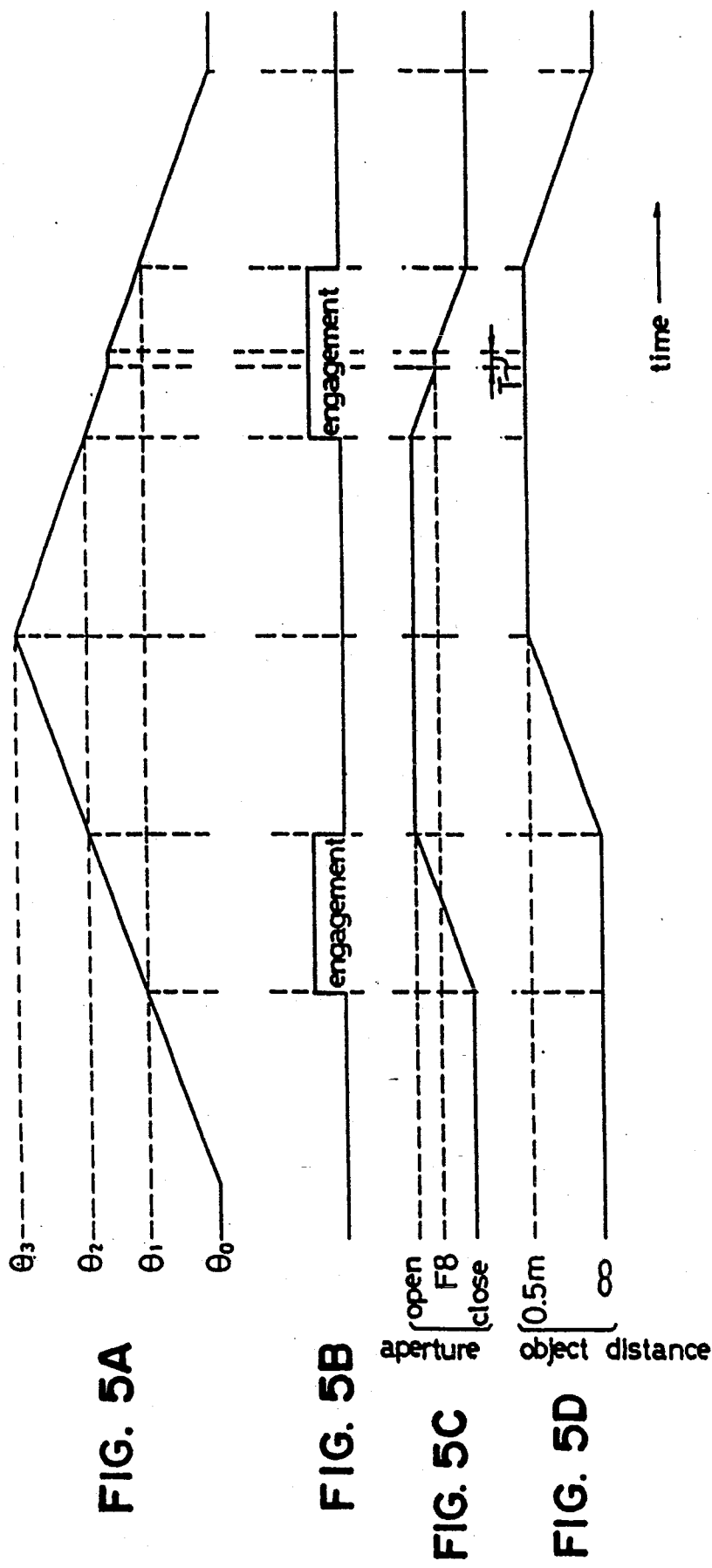
FIGS. 5a–5d, are diagrams showing an operation of each part.

Then, an electronic shutter is operated under the control of the solid state imaging device 20 and the object is photographed. This photographing time is shown in FIG. 5 as a time T.

After the photograph is taken, rearward drive pulses are again supplied to the step motor 46, and accordingly, the focus adjusting plate 48 is rotated to the angle $\theta_0$ so that the movable contact 78 is separated from the fixed contact 76. At this time, a sensor senses that the aperture adjusting plate 58 has been returned to the initial position shown in FIG. 6, and accordingly, rear ends of the push portions 48b and 48d of the focus adjusting plate 48 push against the arms 36b and 36a, to rotate them to the initial position, and thus the lens 34 is returned to the infinity position.

After the above operation is completed, the initial condition is restored as shown in FIG. 6.

Note that, although in the above embodiment the present invention is applied to an electronic still camera, the present invention can be also applied to a conventional camera using a focal plane shutter.

Further, in the above description, an idle gear is used as an intermediate rotation member, and engaging teeth are formed on the focus adjusting plate 48 and the aperture adjusting plate 58 as the first and second members, but these engaging teeth may be replaced by frictional faces so that a rotation force is transmitted therebetween without slippage.

Further, the aperture adjustment and the focus adjustment can be carried out in the opposite order to that described in the above embodiment.

As described above, the aperture and focus adjusting device for a camera of the present invention comprises the first and second adjusting mechanisms which are adjusted by rotations of the first and second members, in accordance with each rotation angle of the members, and the intermediate rotation member which is engaged with the first member to rotate together with the first member within a sector of the rotation range of the first member. In this embodiment, one of the first and second adjusting mechanisms is a focus adjusting mechanism, and the other is an aperture adjusting mechanism. An adjustment for the first adjusting mechanism is carried out by a rotation of the first member by a predetermined angle A in one direction by a motor, and then the motor is rotated in the opposite direction by a predetermined angle B (B<A) to adjust the second adjusting mechanism, and after the photographing operation, this motor is further rotated in this opposite direction by an angle (A-B) to return both adjusting mechanisms to the initial condition. Namely, although two motors are required to effect the aperture and focus adjustments in the prior art, according to the present invention these aperture and focus adjustments can be effected by only one motor, whereby the number of parts is reduced, and therefore, the present invention allows a reduction of the size and weight of a camera and an improvement in the reliability thereof.

Although the embodiments of the present invention have been described herein with reference to the accompanying drawings, obviously many modifications and changes may be made by those skilled in this art without departing from the scope of the invention.

I claim:

1. An aperture adjusting device for a camera comprising:
   a rotatable aperture adjusting plate,
   an aperture adjusting mechanism controlling the value of aperture in accordance with a rotation angle of said aperture adjusting plate, and
   a reversible motor rotating to move said aperture adjusting plate frontward and rearward, said reversible motor being coaxially disposed about an optical axis of the aperture device,
   said reversible motor constantly holding said aperture adjusting plate a closed position, and rotating said aperture adjusting plate, in accordance with a release signal, from said closed position to a rotation position corresponding to an aperture value determined by a photometer, said aperture adjusting plate remaining at the position corresponding to an aperture value determined by a photometer, during operation of a shutter.

2. An aperture adjusting device for a camera according to claim 1, wherein said reversible motor rotates said aperture adjusting plate to said closed position after completion of a shutter release operation.

3. The aperture adjusting device for a camera according to claim 1, wherein said reversible motor is a step motor having a cylindrical rotor, the rotation axis of said cylindrical rotor being aligned with the optical axis of a photographing lens of the camera.

4. The aperture adjusting device for a camera according to claim 1, wherein the photographing lens has a front lens group and a rear lens group, said reversible motor being positioned on an outer periphery of said rear lens.

5. The aperture adjusting device for a camera according to claim 4, wherein said photographing lens is a zoom lens in which a focal length lens is changed in accordance with a change in position of front and rear lens groups.

6. The aperture adjusting device for a camera according to claim 1, further comprising means for positioning said aperture adjustment mechanism at a position corresponding to a fully opened aperture position prior to positioning said aperture adjusting mechanism at a position corresponding to a selected aperture position.

7. The aperture adjusting device for a camera according to claim 1, further including means for locking said aperture adjusting plate in a predetermined position.

8. The aperture adjusting device for a camera according to claim 1, further comprising an intermediate rotation member between said reversible motor and said aperture adjusting plate.

9. The aperture adjusting device for a camera according to claim 1, wherein said closed position is an aperture closed down position.

* * * * *

UNITED STATES PATENT AND TRADEMARK OFFICE
CERTIFICATE OF CORRECTION

PATENT NO. : 5,237,357
DATED : August 17, 1993
INVENTOR(S) : T. MORISAWA

It is certified that error appears in the above-indentified patent and that said Letters Patent is hereby corrected as shown below:

On the title page, Item [57], under "ABSTRACT", delete "is".

At column 8, line 12 (claim 1, line 12), insert ---in--- after "plate".

Signed and Sealed this

Sixth Day of September, 1994

Attest:

BRUCE LEHMAN

*Attesting Officer*      *Commissioner of Patents and Trademarks*